(12) United States Patent
Nishio

(10) Patent No.: US 7,443,862 B2
(45) Date of Patent: Oct. 28, 2008

(54) APPARATUS CONNECTED TO NETWORK, AND ADDRESS DETERMINATION PROGRAM AND METHOD

(75) Inventor: Masahiro Nishio, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1010 days.

(21) Appl. No.: 10/329,389

(22) Filed: Dec. 27, 2002

(65) Prior Publication Data

US 2003/0140283 A1 Jul. 24, 2003

(30) Foreign Application Priority Data

Jan. 22, 2002 (JP) ............................. 2002-013088

(51) Int. Cl.
*H04L 12/56* (2006.01)
(52) U.S. Cl. .................. 370/395.54; 370/389; 709/245
(58) Field of Classification Search ................ 370/389, 370/390, 392, 393, 395.54, 432, 475; 709/219, 709/245
See application file for complete search history.

(56) References Cited

U.S. PATENT DOCUMENTS

| | | | | |
|---|---|---|---|---|
| 5,490,139 | A * | 2/1996 | Baker et al. .................. | 370/312 |
| 5,586,269 | A | 12/1996 | Kubo ......................... | 395/250 |
| 5,854,901 | A | 12/1998 | Cole et al. ............. | 395/200.75 |
| 6,052,725 | A * | 4/2000 | McCann et al. ............. | 709/223 |
| 6,061,739 | A * | 5/2000 | Reed et al. .................. | 709/245 |
| 6,101,499 | A * | 8/2000 | Ford et al. .................... | 707/10 |
| 6,141,690 | A * | 10/2000 | Weiman ...................... | 709/228 |
| 6,377,990 | B1 * | 4/2002 | Slemmer et al. ............ | 709/225 |
| 6,434,134 | B1 * | 8/2002 | La Porta et al. ............. | 370/338 |
| 6,523,068 | B1 * | 2/2003 | Beser et al. ................. | 709/238 |
| 6,826,611 | B1 * | 11/2004 | Arndt ......................... | 709/226 |
| 6,957,276 | B1 * | 10/2005 | Bahl ........................... | 709/245 |
| 7,042,879 | B2 * | 5/2006 | Eschbach et al. ............ | 370/392 |
| 7,136,385 | B2 * | 11/2006 | Damon et al. ........... | 370/395.31 |
| 7,152,117 | B1 * | 12/2006 | Stapp et al. .................. | 709/245 |
| 7,254,630 | B1 * | 8/2007 | Daude et al. ................. | 709/224 |
| 7,281,037 | B2 * | 10/2007 | Bahlmann .................... | 709/221 |
| 2001/0017857 | A1 | 8/2001 | Matsukawa .................. | 370/392 |
| 2001/0056499 | A1 | 12/2001 | Shirai et al. .................. | 709/245 |

(Continued)

FOREIGN PATENT DOCUMENTS

JP 07-030560 1/1995

(Continued)

OTHER PUBLICATIONS

"Duplicate Internet Protocol Address Detection Based on Gratuitous Address Resolution Protocol", IBM Technical Disclosure Bulletin, vol. 41, No. 01, pp. 703-705, Jan. 1998.

(Continued)

*Primary Examiner*—Chi H. Pham
*Assistant Examiner*—Kevin Mew
(74) *Attorney, Agent, or Firm*—Fitzpatrick, Cella, Harper & Scinto

(57) ABSTRACT

A network-capable device stores an address of another device. The network-capable device determines whether or not a connected network has been changed. If it has not been changed, then an address other than the address of the other device stored is determined as an address of the apparatus.

9 Claims, 5 Drawing Sheets

U.S. PATENT DOCUMENTS

| | | | |
|---|---|---|---|
| 2002/0040407 A1* | 4/2002 | Oh | 709/245 |
| 2002/0112076 A1* | 8/2002 | Rueda et al. | 709/245 |
| 2003/0088650 A1* | 5/2003 | Fassold et al. | 709/220 |
| 2005/0223114 A1* | 10/2005 | Hanson et al. | 709/245 |
| 2006/0047791 A1* | 3/2006 | Bahl | 709/220 |

FOREIGN PATENT DOCUMENTS

| | | |
|---|---|---|
| JP | 11-098157 | 4/1999 |
| JP | 2001-244945 | 7/2001 |
| JP | 2001/230782 | 8/2001 |
| JP | 2002-009823 A | 1/2002 |

OTHER PUBLICATIONS

Thomson, S., et al., "IPv6 Stateless Address Autoconfiguration", Request for Comments: 2464, pp. 1-25, Dec. 1998.

Kucheria, A., "IPv4 Link-local Address Selection, Defense and Delivery", EECS 801: Dynamic Configuration of IPv4 Link-Local Addresses, Online, pp. 1-4, Nov. 19, 2001 (http://www.ittc.ku.edu/~amitk/801/801-doc.html).

Patent Abstracts of Japan, JP 11-098157, Apr. 9, 1999, Japanese Patent Office.

Patent Abstracts of Japan, JP 2001-230782, Aug. 24, 2001, Japanese Patent Office.

\* cited by examiner

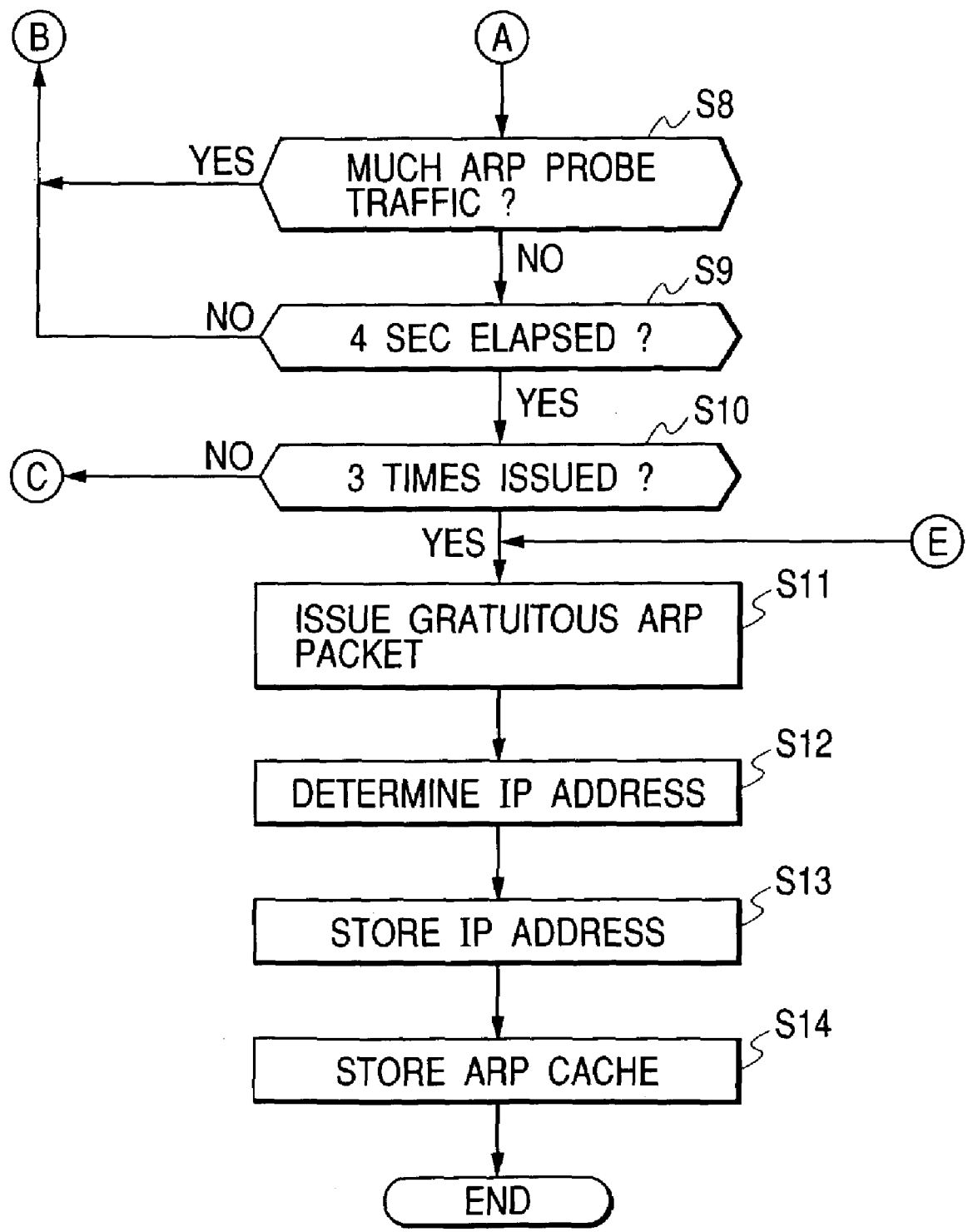

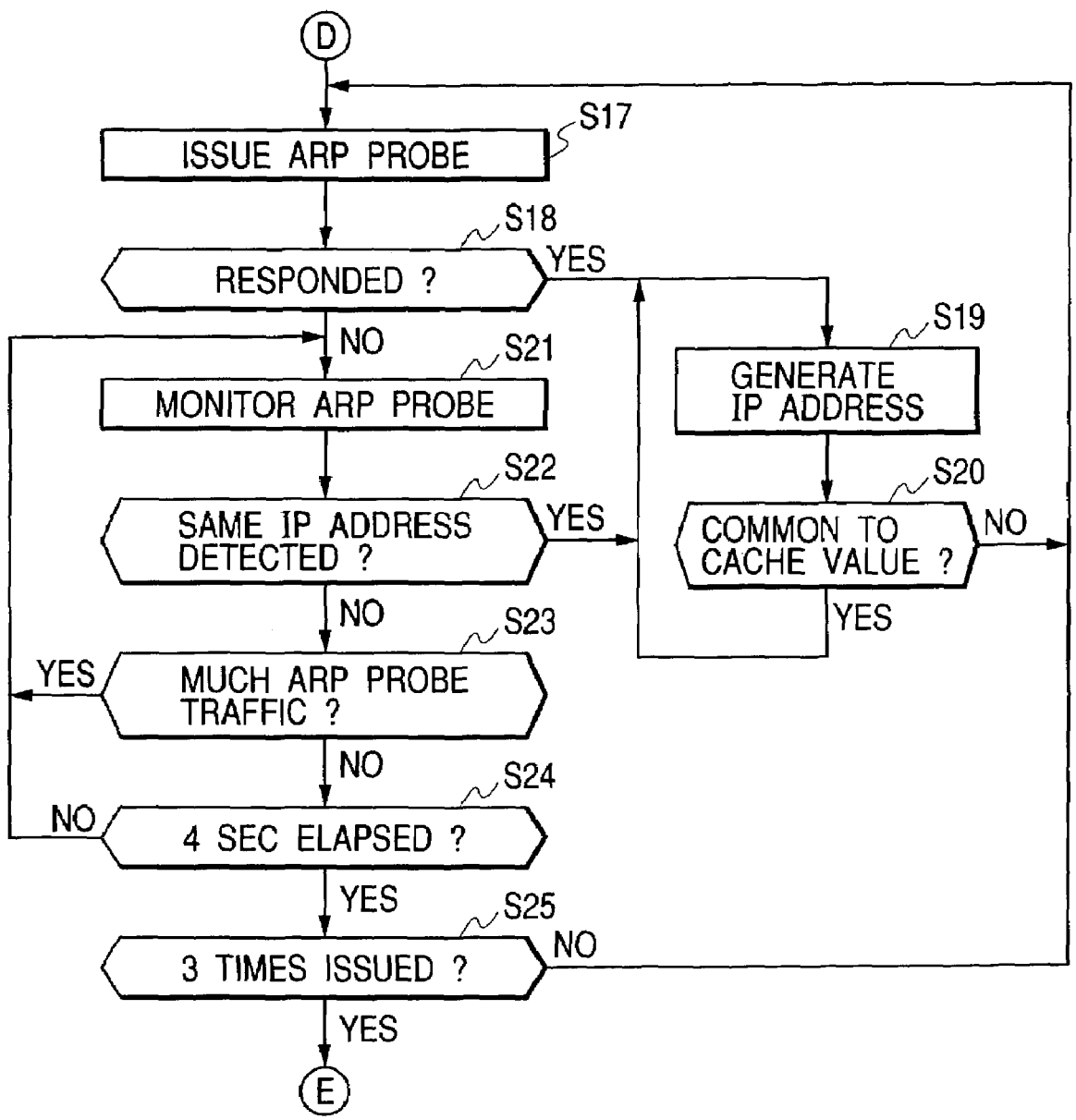

APPARATUS CONNECTED TO NETWORK, AND ADDRESS DETERMINATION PROGRAM AND METHOD

BACKGROUND OF THE INVENTION

1. Field of the Invention

The present invention relates to an apparatus connected to a network, and an address determination program and method.

2. Description of the Related Art

With the remarkable progress of communications on the Internet, conventional network-capable equipment has been developed into various network-capable appliances such as not only conventional personal computers but also user interactive devices including PDA (personal digital assistance), mobile telephones, etc., image processing devices including scanners, printers, copying machines, digital cameras, etc., and household electric appliances including televisions, air-conditioners, refrigerators, etc.

Correspondingly, the procedure for a network connection of a network-capable equipment conventionally used by a network manager has been simplified. Especially, relating to setting an IP address which is very important in setting an Internet protocol (IP), the conventional manual setting process has been replaced with a newly suggested automatic IP address assigning process using a DHCP (dynamic host configuration protocol) server, or an automatic IP address acquiring process (draft-ietf-zeroconf-ipv4-linklocal-01.txt) suggested for a SOHO (small office/home office) environment, that is, a network environment in which a server cannot be mounted. In the Universal Plug and Play Device Architecture v1.0 presented by Microsoft Corporation, the above mentioned automatic IP address acquiring process is adopted. Thus, the common users can use the above mentioned network-capable equipment without consideration of the setting regulations and the management of an IP address, etc.

However, there have been the following problems with the above mentioned conventional technology.

That is, if a network-capable device implements an algorithm for acquiring an IP address as recommended in the above mentioned automatic IP address acquiring process (draft-ietf-zeroconf-ipv4-linklocal-01.txt), then the network-capable device performs a process of acquiring a new IP address upon start-up. However, if a number of devices simultaneously start up every morning or immediately after a failure such as a power failure, etc. occurs or in the environment of several tens of units of network-capable equipment connected to a network, then there occurs network traffic by an ARP (address resolution protocol) packets for check of addresses on the network, and there can occur a conflict for IP addresses depending on the settings of waiting time for a ARP response.

Furthermore, if there are no dynamic DNS (domain name service, which is a distribution directory management system for Internet, for associating an IP address with a domain name) in the network, then a client who uses the network-capable service has to establish communications using an IP address not a host name. Therefore, each time the IP address of the network-capable device is changed, it is necessary also change the settings of the client application.

SUMMARY OF THE INVENTION

The present invention first aims at minimizing the possibility of the conflict with other devices for an address.

The present invention second aims at reducing the traffic.

Furthermore, the present invention third aims at avoiding the necessity for changing the settings of the client application using a device.

Other objects of the present invention will be apparent from the descriptions of the embodiments of the present invention below.

BRIEF DESCRIPTION OF THE DRAWINGS

FIG. 4 is a flowchart of the process in the network-capable device according to an embodiment of the present invention; and FIG. 5 is a flowchart of the process in the network-capable device according to an embodiment of the present invention.

DETAILED DESCRIPTION OF THE PREFERRED EMBODIMENTS

First, the outline of the present invention is described before explaining the details of the embodiments of the present invention.

Figure 1:
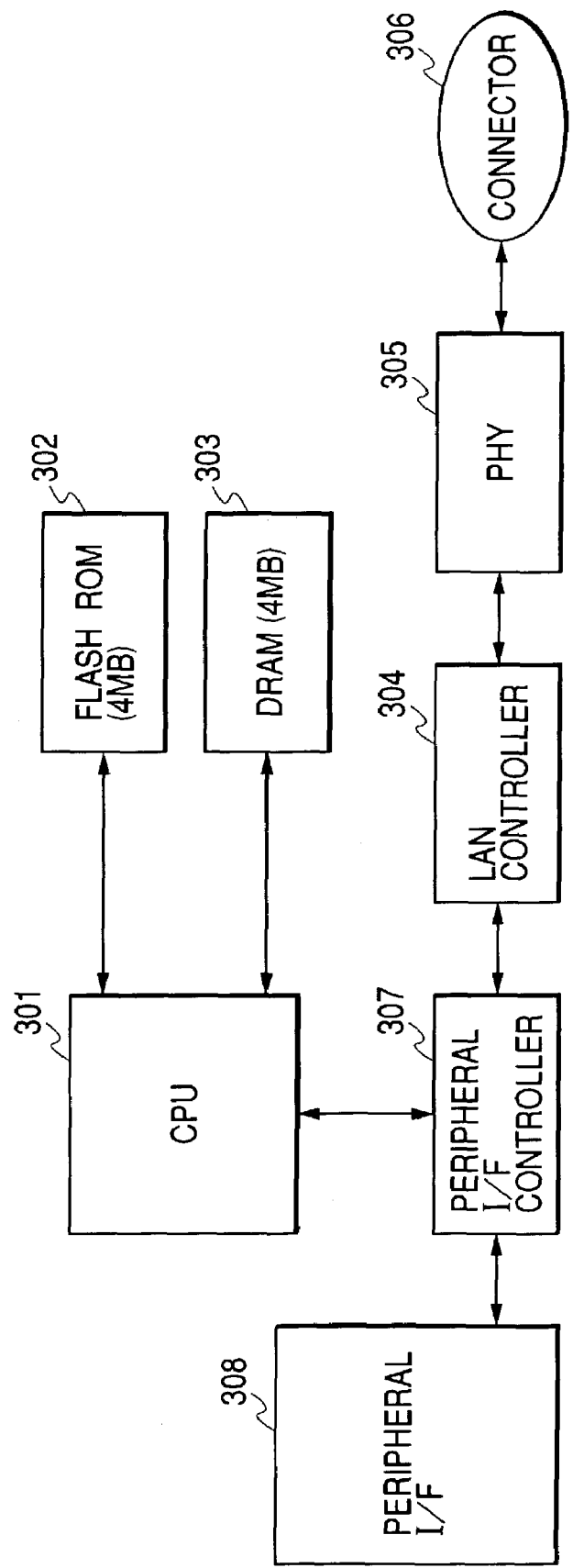
FIG. 1 is a block diagram of the configuration of the hardware of the network-capable device according to an embodiment of the present invention.

According to the embodiments of the present invention, the network-capable device with the configuration shown in FIG. 1 generates an IP address, and checks whether or not the generated IP address conflicts with other network-capable devices connected to the network, generates an IP address until no conflict is detected, accepts an IP address indicating no conflict as an IP address of the network-capable device, and stores the accepted IP address and the physical addresses and the IP addresses of the other network-capable devices.

According to an embodiment of the present invention, the network-capable device with the configuration shown in FIG. 1 checks whether or not the currently connected network segment is the same network segment as the network segment connected before. If yes, the adopted IP address is set as the first prospect for an IP address, and the IP addresses other than the stored IP addresses of the other network-capable devices are set as the second and subsequent prospects for an IP address. If not, a random number is set as a prospect for an IP address in a predetermined range.

According to an embodiment of the present invention, the network-capable device with the configuration shown in FIG. 1 issues a packet for check as to whether or not it conflicts with other network-capable devices, monitors the packets issued by the network-capable devices, and stops issuing a packet for check as to whether or not it conflicts with other network-capable devices until the traffic can be reduced equal to or below a predetermined value if the traffic of the received packets in a unit time exceeds the predetermined value.

The embodiment of the present invention is described below in detail.

FIG. 1 is a block diagram showing the configuration of the hardware of the network-capable device according to the embodiment of the present invention. The network-capable device comprises a CPU 301, flash ROM 302, RAM 303, a LAN (local area network) controller 304, a LAN physical layer control unit (PHY) 305, a connector 306, a peripheral interface controller 307, and a peripheral interface 308.

The above mentioned configuration is described below in detail. That is, the CPU 301 is the central processing unit for controlling each network-capable device, and performs the process shown in the flowchart in FIGS. 3 to 5 according to the program code stored in the flash ROM 302. The CPU 301 is determination means for determining an address of the network-capable device. According to the present embodiment, the CPU 301 uses a 32-bit RISC (reduced instruction set computer) chip. The flash ROM 302 holds a program code and a network management information database table. The flash ROM 302 also stores the software for realizing the automatic acquisition of an IP address. A part of the area of the flash ROM 302 is used as a nonvolatile memory area, and is used for storage of a user defined parameter, configuration (environment setting) information, etc. The configuration information includes the addresses of the other devices connected to the network. The configuration information includes the address of the network-capable device.

The RAM 303 is configured as DRAM (dynamic RAM), and is used as a work area. According to the present embodiment, the program execution code and the network management information database table stored in the flash ROM 302 are copied to the RAM 303 after the activation, and the execution of the program code is started when the copying operation is completed. The network management information database table contains the addresses of the other devices connected to the network. Additionally, the network management information database table contains the address of the present network-capable device.

The LAN controller 304 and the LAN physical layer control unit 305 connect the network-capable device to Ethernet (R) through the connector 306. The connector 306 is configured as an 8-pin modular jack (RJ45-8).

The LAN controller 304 uses a bus master type, arbitrates the bus right with the CPU 301 by the transmission/reception as an event trigger, and is reserved in the RAM 303 independent of the CPU 301 for transmission/reception of the data in the transmission/reception buffer. The LAN controller 304 is communications means for communications with other devices through a network.

The peripheral I/F controller 307 is connected to a peripheral not shown in the attached drawings, functions as an ASIC (application specified IC) for control of the communications with the peripheral, and comprises 32-KB dual port RAM. It communicates data with a peripheral using a memory area of the above mentioned dual report RAM. According to the present embodiment, a printer is described as a peripheral device, but the hardware configuration of a peripheral (printer) is configured by a CPU/ROM/RAM as with the present network-capable device, and is configured independently of a control system of the communications control unit (not shown in the attached drawings).

Figure 2:
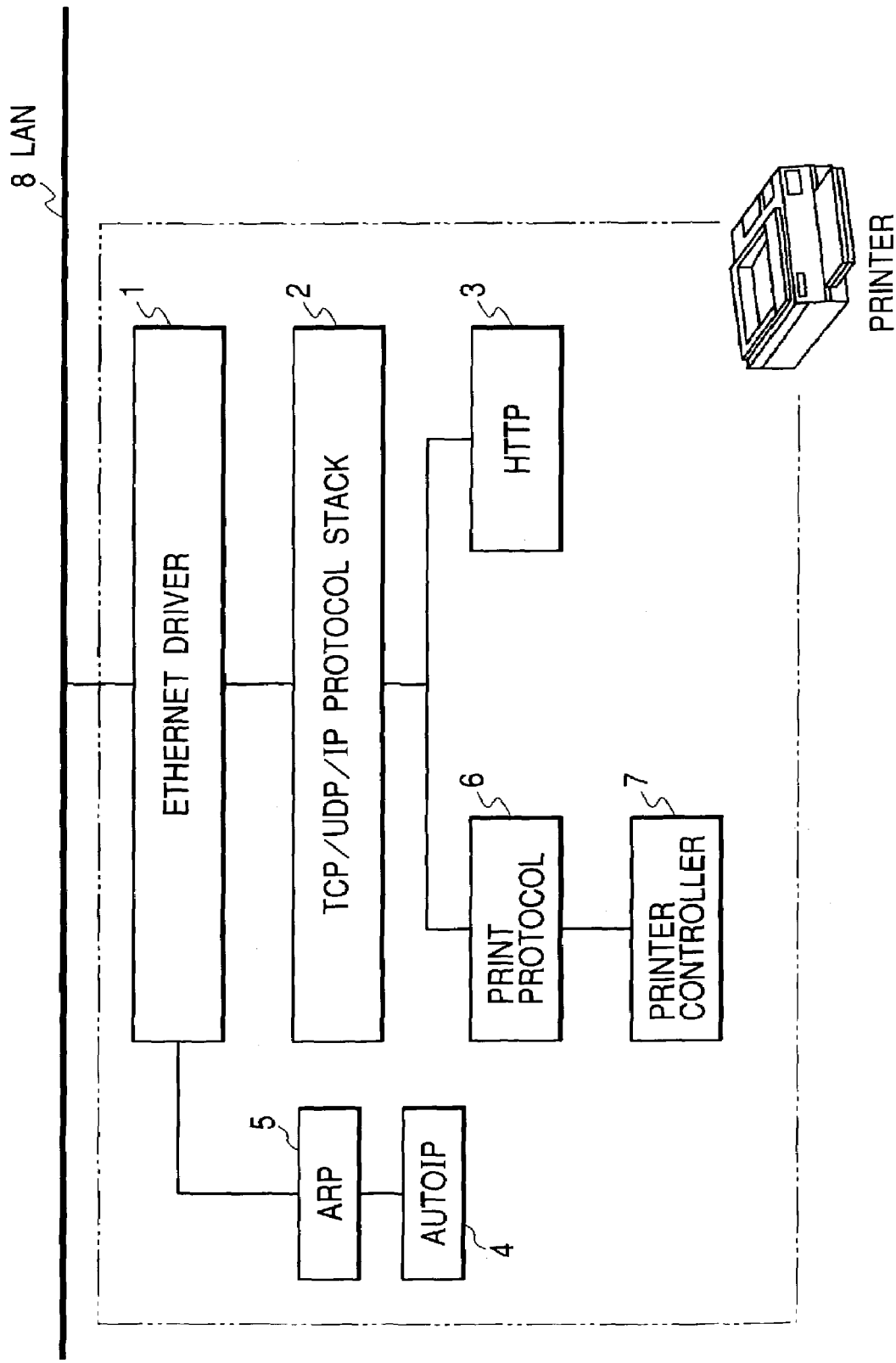
FIG. 2 is a block diagram of the configuration of the software of the network-capable device according to an embodiment of the present invention.

FIG. 2 is a block diagram of the configuration of the software of the network-capable device according to an embodiment of the present invention. The network-capable device comprises an Ethernet (registered) diver 1, a TCP/UDP/IP (transmission control protocol/user datagram protocol/Internet protocol) stack 2, an HTTP (hyper text transfer protocol) 3, an automatic IP address acquisition process (auto IP) unit 4, an ARP (address resolution protocol) 5, a print protocol module 6, and a printer controller 7.

The above mentioned configuration is described below in detail. That is, according to the present embodiment, the network-capable device is configured as a printer. The network-capable device comprises the TCP/UDP/IP protocol stack 2 as a communications facility on the Ethernet (R) diver 1, implements the function of the HTTP 1.1 server (HTTP 3) on the TCP/UDP/IP protocol stack 2, and provides a service such as the configuration of a device, the acquisition of a status, etc. through the HTTP 1.1 server (HTTP 3).

The automatic IP address acquisition process unit 4 is implemented in the upper layer of the network driver structure, also implemented in the upper layer of the ARP 5, and controls the transmission/reception of an ARP probe packet and an ARP packet described later.

Furthermore, the print protocol module 6 is implemented on the TCP/UDP/IP protocol stack 2, analyzes a print request issued from a client connected to a LAN 8, and has the function of transmitting the print request to the printer controller 7.

Figure 3:
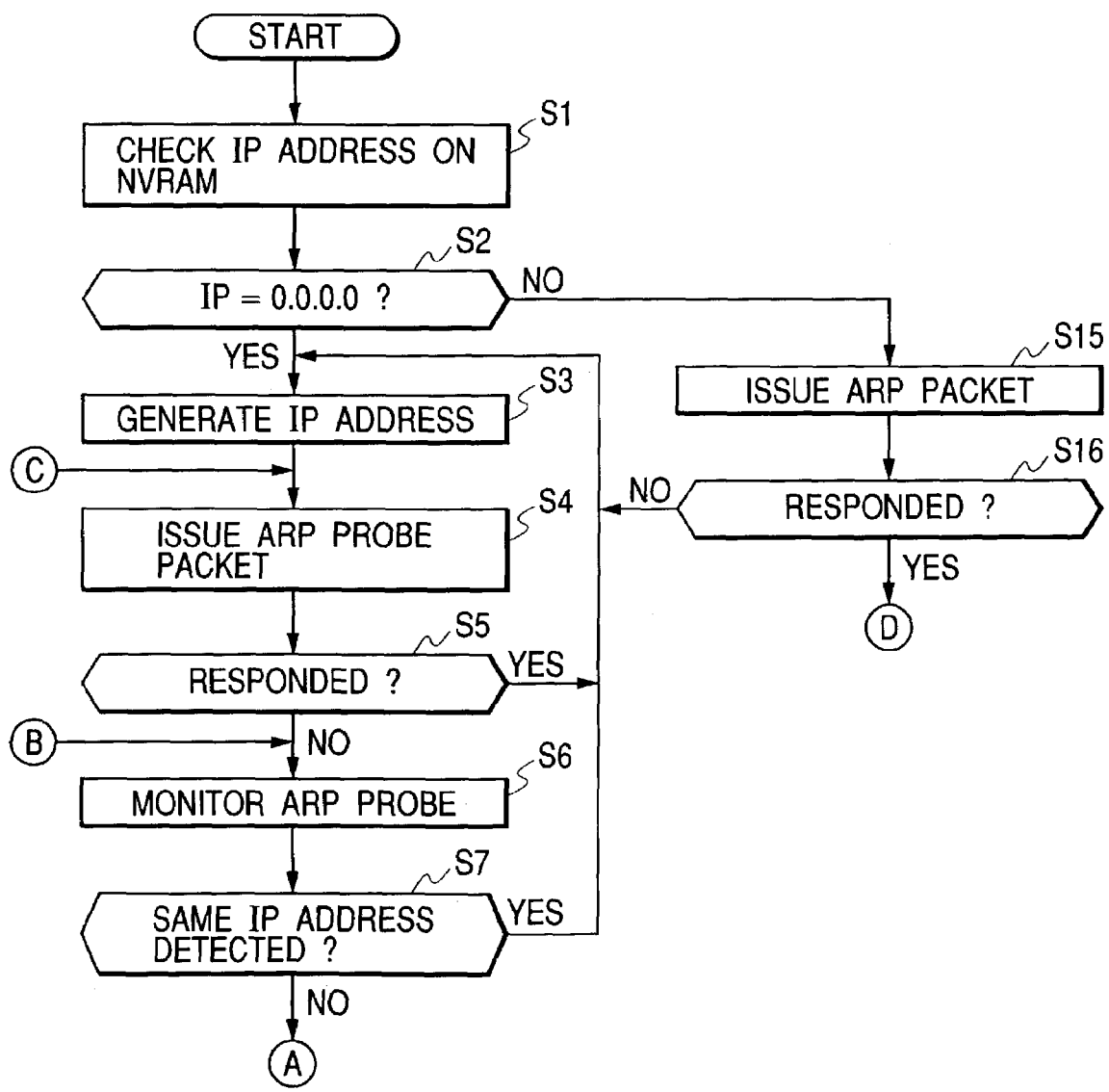
FIG. 3 is a flowchart of the process in the network-capable device according to an embodiment of the present invention.

The operations of the network-capable device configured as described above are described below in detail by referring to the flowcharts shown in FIGS. 3 to 5. The processes shown in the flowcharts in FIGS. 3 to 5 are performed by the CPU 301 of the network-capable device based on the program code stored in the flash ROM 302.

The network-capable device checks the IP address of the network-capable device recorded in the nonvolatile memory (flash ROM 302) after the activation (step S1). If the IP address value of the network-capable device recorded in the nonvolatile memory is 0.0.0.0 (that is, the IP address value previously used by the network-capable device is not recorded), then the network-capable device is newly connected to the network (YES in step S2), and an IP address is selected (generated) from an automatic IP address range 169.254.1.0-169.254.254.255 registered in the IANA (Internet assigned number authority) according to the automatic IP address acquisition procedure (draft-ietf-zeroconf-ipv4-link-local-01.txt).

According to an embodiment of the present invention, when the above mentioned IP address is generated, random numbers in the range from 0 to 255 are generated for the 3 lower order bytes, thereby generating a prospective IP address (step S3). In this case, when the random numbers are generated, the product of the lowest order byte value of the MAC (media access control) address of the network-capable device and the accumulated time from the activation of the network-capable device is used as a core.

Then, to check whether or not the IP address generated in step S3 has already been used in other devices operating in the network, the IP address generated in step S3 is set as a target IP address, the source address is set as a physical address of the network-capable device, and an ARP probe packet to which 0.0.0.0 is set is issued to the source IP address (step S4). Simultaneously, the internal timer is cleared to zero.

When there is a response to the ARP probe packet (YES in step S5), the IP address generated in step S3 is being used by another device operating in the network. Therefore, a prospective IP address is generated again in step S3, and the processes in and after step S4 are performed.

If there is no response to the ARP probe packet (NO in step S5), then the presence/absence of the ARP probe packet issued from another device is monitored (step S6). If an ARP probe packet is received, and the value of the target IP address of the ARP probe packet is equal to the IP address generated in step S3 above (YES in step S7), then there arises a conflict for the IP address with other devices which has started operating on the network. Therefore, no response to the ARP probe packet is received, control is returned to the procedure in step S3, a prospective IP address is generated again, and the processes in and after step S3 are performed.

In the present embodiment, the verification is repeated three times at 4-second intervals in steps S4 to S7 according to the recommendation described in the above mentioned automatic IP address acquisition procedure (draft-ietf-zero-conf-ipv4-linklocal-01.txt). However, according to the present embodiment, the interval of the re-verification is adjusted depending on the traffic of the ARP probe packet in the network in the following procedure.

If no conflict for an IP address is detected in step S6, the number of received ARP probe packets per second is measured. If the number of received ARP probe packets exceeds 50 packets/sec., then the traffic increases by a plurality of devices in a network simultaneously executing the automatic IP address acquisition process, such as simultaneous restoration after the power failure. According to the present embodiment, the ARP probe packet is continuously monitored until the number of received ARP probe packets is reduced and equal to or smaller than 10 packets/sec. (step S8). Thus, the reduction of the traffic in the network is realized. If the number of received ARP probe packets is equal to or smaller than 10 packets/sec., and four seconds have passed after the network-capable device issued the ARP probe (YES in step S9), then control is returned to step S4, and an ARP probe is issued again.

By repeating the processes in steps S4 to S7 three times (YES in step S10), it is confirmed that there is no conflict for an IP address with other devices in the network. Therefore, a Gratuitous ARP packet in which a physical address and an IP address of the network-capable device are set for the destination and the source in the network is issued, and the other devices in the network are prompted to update the ARP cache (step S11). After the above mentioned processes have been completed, the IP address of the network-capable device is determined (step S12), and the determined IP address of the network-capable device is stored in the nonvolatile memory (flash ROM 302) (step S13).

Afterwards, upon receipt of a Gratuitous ARP packet issued by another device in the network, the contents of the ARP cache of the DRAM 303 are constantly updated by the physical address and the IP address of the other device set in the Gratuitous ARP packet, and the updated contents are similarly stored in the nonvolatile memory (flash ROM 302) (step S14).

Then, a higher order application which uses an IP refers to the IP address in performing each service.

If the IP address value recorded in the nonvolatile memory (flash ROM 302) indicates a value other than 0.0.0.0 in step S1, that is, if the IP address value previously used by the network-capable device is recorded (NO in step S2), then an ARP packet is issued based on the contents of the ARP cache recorded in the nonvolatile memory (flash ROM 302) to check whether or not the network segment to which the network-capable device is currently connected is the same network segment as the previously connected network segment. The ARP cache stores the physical address and the IP address of another device connected to the network. When an ARP packet is issued, the highest order byte of the IP address refers to a value other than 162, that is, the automatic IP address acquiring process is not performed, an ARP packet is issued to the device having the smallest possibility of a change in IP address, and it is checked whether or not there is a device having the IP address in the network (step S15).

If no response to the ARP packet is received (NO in step S16), then it is determined that the network-capable device is connected to a network segment different from the previously connected network segment, and the processes in steps S3 to S14 are performed because it is necessary to newly acquire an IP address.

If a response to the ARP packet is received (YES in step S16), then it is determined that the network-capable device is connected to the same network segment as the previously connected network segment. In this case, the IP address stored in the nonvolatile memory (flash ROM 302), that is, the IP address used in the previous connection to the network is used, and it is checked whether or not the IP address generated in step S3 has already been used in other devices operating in the network. To make the check, the IP address generated in step S3 is set as a target IP address, the source address is set as a physical address of the network-capable device, and an ARP probe packet to which 0.0.0.0 is set is issued to the source IP address. Simultaneously, the internal timer is cleared to zero (step S17).

When a response to the ARP probe packet is received (YES in step S18), the IP address is being used by another device operating in the network. In this case, a prospective IP address is generated in the same procedure as that in step S3 (step S19). If the generated IP address value is the same as the contents (the IP address of another device connected to the network) stored in the ARP cache stored in the nonvolatile memory (flash ROM 302) (YES in step S20), then another IP address is generated again, and the possibility of a conflict for the IP address of the device operating in the network can be minimized.

If there is no response to the ARP probe packet (NO in step S18), then the presence/absence of the ARP probe packet issued from another device is monitored (step S21). If an ARP probe packet is received, and the value of the target IP address of the ARP probe packet is equal to the IP address of the network-capable device (YES in step S22), then there arises a conflict for the IP address with other devices which has started operating in the network. Therefore, no response to the ARP probe packet is received, a prospective IP address is generated again (step S19), and the processes in and after step S17 are performed.

In the present embodiment, the verification is repeated three times at 4-second intervals in steps S21 and S22 according to the recommendation described in the above mentioned automatic IP address acquisition procedure (draft-ietf-zero-conf-ipv4-linklocal-01.txt). However, according to the present embodiment, the interval of the re-verification is adjusted depending on the traffic of the ARP probe packet in the network in the following procedure.

If no conflict for an IP address is detected in step S21, the number of received ARP probe packets per second is measured. If the number of received ARP probe packets exceeds 50 packets/sec., then the traffic increases by a plurality of devices in a network simultaneously executing the automatic IP address acquisition process, such as simultaneous restoration after the power failure. According to the present embodiment, the ARP probe packet is continuously monitored until the number of received ARP probe packets is reduced and equal to or smaller than 10 packets/sec. (step S23). Thus, the reduction of the traffic in the network is realized. If the number of received ARP probe packets is equal to or smaller than 10 packets/sec., and four seconds have passed after the network-capable device issued the ARP probe (YES in step S24), then control is returned to step S17, and an ARP probe is issued again.

After repeating the processes in steps S17 to S24 three times (step S25), control is passed to step S11.

According to the present embodiment, a printer is explained as a network-capable device. However, a network-capable device can be a scanner, a facsimile, a copying machine, a composite unit having a function obtained by combining any of them (an image reading facility, a facsimile facility, an image forming facility), an image processing apparatus such as a digital camera, etc., and, in addition to the image processing apparatus, an apparatus for processing information. The present invention can be realized in any of these types of facilities.

Furthermore, according to the present embodiment, a random number generating algorithm is used each time a new IP address is generated. However, when a conflict is detected after once generating an IP address, and an IP address is generated again, the present invention can be realized by adopting other process procedures such as simply adding or subtracting a specified value to or from the newly generated IP address.

Additionally, according to the present embodiment, the presence/absence of the conflict for an IP address with another device is checked by issuing an ARP probe three times at 4-second intervals. However, these values are not limited to the above mentioned values, or the settings of these values can be changed through an operation panel of a network-capable device, or an HTTP server, etc. implemented in the network-capable device.

Similarly, the number of packets in a time unit in the measurement of the traffic of an ARP probe is not limited to the example above, but the settings can also be changed according to the present invention.

According to another embodiment of the present invention, the interval/frequency of issuing an ARP probe can depend on the number of probe packets issued from another device in a unit time in synchronization with the traffic of the ARP probe.

According to another embodiment of the present invention, the flash ROM 302 stores the ARP cache for the first network and the first IP address of the network-capable device, and the ARP cache for the second network and the second IP address of the network-capable device. If there is a device in the network having the IP address contained in the ARP cache for the first network, then the first IP address is used as the IP address of the network-capable device. If there is a device in the network having the IP address contained in the ARP cache for the second network, then the second IP address is used as the IP address of the network-capable device.

According to the present embodiment of the present invention, the contents of the ARP cache are stored in the nonvolatile memory (flash ROM 302) as the information about the MAC address and the IP address of another network-capable device connected to the network. According to another embodiment of the present invention, a GENA (general event notification architecture) Notify packet prescribed by the Universal Plug and Play Device Architecture 1.0 presented by Microsoft is monitored, the IP address of another network-capable device is acquired from the location header of the packet, the MAC address is acquired from the UUID header, and the information about the MAC addresses and IP addresses of the network devices existing in the network and capable of issuing a Notify packet is recorded in the nonvolatile memory from all received Notify packets.

The present invention can be applied to a system configured by a plurality of appliances or to a device comprising one appliance. The present invention can be realized by providing a system or a device with a medium such as a storage medium, etc. storing a program code of the software for realizing the function according to the above mentioned embodiments, and by the computer (or the CPU or MPU) of the system and the device reading and executing the program code stored in the medium such as a storage medium, etc.

In this case, the program code read from the medium such as a storage medium, etc. realizes the function of the above mentioned embodiments, and the medium such as a storage medium, etc. storing the program code configures the present invention. The medium such as a storage medium, etc. for providing a program code can be, for example, a floppy (registered trademark) disk, a hard disk, an optical disk, a magneto-optic disk, CD-ROM, CD-R, a magnetic tape, a nonvolatile memory card, ROM, etc.

The present invention also includes not only the realization of the function of the above mentioned embodiments by executing the program code read by the computer, but also the realization of the function of the above mentioned embodiments by the process all or a part of which is performed by the OS operating in the computer at an instruction of the program code.

Furthermore, the present invention also includes the realization of the function of the above mentioned embodiments by the process all or a part of which is performed by the CPU, etc. provided in a feature expansion board and a feature expansion unit at an instruction of a program code after it is read from a medium such as a storage medium, etc. and written to the memory provided in the feature expansion board inserted into a computer and a feature expansion unit connected to the computer.

What is claimed is:

1. An apparatus connected to a network, comprising:
communication means for communicating with another device over a network;
determination means for determining an address of the apparatus; and
memory means for storing a first address which was used by the apparatus when the apparatus was connected to the network and for storing a second address which was used by another device which was connected to the network,
wherein said determination means determines whether or not there is a device which uses the second address stored in said memory means, and determines that the first address stored in said memory means is reused as the address of the apparatus if there is the device which uses the second address stored in said memory means.

2. The apparatus according to claim 1, wherein said determination means determines an address other than the second address stored in said memory means as the address of the apparatus if there is the device which uses the address stored in said memory means.

3. The apparatus according to claim 1, wherein said determination means controls depending on traffic on the network a transmission of a signal for use in checking whether or not there is the device which uses the first address.

4. A computer-readable medium for storing a computer program to be executed by an apparatus for determining an address of the apparatus, the computer program, comprising:
an obtaining step of obtaining a first address which was used by the apparatus when the apparatus was connected to a network and obtaining a second address which was used by another device which was connected to the network;
a determining step of determining whether or not there is a device which uses the second address obtained in said obtaining step; and
a reusing step of reusing the first address obtained in said obtaining step as the address of the apparatus when there is the device which uses the second address obtained in said obtaining step.

5. The program according to claim 4, wherein in said reusing step, when there is the device which uses the first address obtained in said obtaining step, an address other than the second address obtained in said obtaining step is determined as the address of the apparatus.

6. The program according to claim 4, wherein in said reusing step, a transmission of a signal for use in checking whether or not there is the device which uses the first address is controlled depending on traffic on the network.

7. An address determination method for determining an address of an apparatus, the method comprising:

- an obtaining step of obtaining a first address which was used by the apparatus when the apparatus was connected to a network, and obtaining a second address which was used by another device which was connected to the network;
- a determining step of determining whether or not there is a device which uses the second address obtaining step; and
- a reusing step of reusing the first address obtained in said obtaining step as the address of the apparatus when there is the device which uses the second address obtained in said obtaining step.

8. The method according to claim 7, wherein in said reusing step, when there is the device on the network which uses the first address obtained in said obtaining step, an address other than the second address obtained in said obtaining step is determined as the address of the apparatus.

9. The method according to claim 8, wherein in said reusing step, a transmission of a signal for use in checking whether or not there is the device which uses the first address is controlled depending on traffic on the network.

* * * * *